June 26, 1951 — W. A. HUMPHREY — 2,558,438
THERMAL TIMER FOR ELECTRIC TOASTERS

Filed May 28, 1947 — 2 Sheets-Sheet 1

INVENTOR.
Warren A. Humphrey
BY Harry S. Dumasse
ATTORNEY.

June 26, 1951 W. A. HUMPHREY 2,558,438
THERMAL TIMER FOR ELECTRIC TOASTERS
Filed May 28, 1947 2 Sheets-Sheet 2

INVENTOR.
Warren A. Humphrey
BY
Harry S. Dumarse
ATTORNEY

Patented June 26, 1951

2,558,438

UNITED STATES PATENT OFFICE 2,558,438

THERMAL TIMER FOR ELECTRIC TOASTERS

Warren A. Humphrey, Canton, Ohio, assignor to The Hoover Company, North Canton, Ohio, a corporation of Ohio Application May 28, 1947, Serial No. 751,017

20 Claims. (Cl. 161—1)

The present invention relates to toasters and more particularly to a thermal timer therefor.

When a toaster is used in rapid succession the toast chamber heats up more and more for each succeeding toasting operation until an equilibrium is reached between the heat dissipating characteristics of the toaster as a whole and the heating capacity of the toaster heaters.

It has been found than when the thermal timers are used in toasters that they have a tendency to over-compensate when toasting operations follow each other in rapid succession. That is, as the toaster as a whole heats up, the thermal timer and associated parts also heat up but at a faster rate because of their close association with the toaster as a whole which becomes hotter and hotter with each succeeding toasting operation until the above mentioned equilibrium is reached.

As a result, in prior thermal timers it takes less and less time for the thermal timer to operate with each succeeding toasting operation. Eventually the timer will operate so quickly that the toast will be underdone. In prior thermal timers, if the timer is properly set for toasting the first slices when the toaster as a whole is cold for succeeding toasting operations, the toast will be done less and less.

In its broadest aspects, the object of this invention is to remedy the foregoing defects.

It is old to provide an auxiliary heater for thermal timers in toasters connected in circuit with the main heaters and to time the toasting operation by the time it takes for the auxiliary heater to heat the thermal timer to a predetermined temperature.

It is also old to provide a reflector for reflecting heat from the auxiliary heater to the thermal timer and to control the amount of heat reflected from the auxiliary heater to the timer, both manually to adjust for light, medium, or dark toast, and thermostatically to compensate for rises in toaster temperature with repeated use.

Such arrangements, however, have not been satisfactory. It has been found that such reflectors trap heat within the confines of the reflector so that even though the reflector is adjusted either manually or thermostatically to direct more or less heat to the thermal timer, the thermal timer will over-compensate with repeated use due to the heat entrapped within the reflector.

It is also known to move a shield between the reflector and heater in a thermal timer, either manually or thermostatically, to regulate the amount of heat transmitted to the thermal timer.

That arrangement has also not been entirely satisfactory due to the heat entrapped within the space between the reflector and the shield. This influences the heat transmitted to the thermal timer and causes it to be over-compensated, i. e. to act too quickly.

Specifically, it is an object of this invention to avoid the foregoing disadvantages by permitting the heat entrapped by the reflector to be immediately dissipated upon rises in toaster temperature and to provide a thermal timer which will accurately time each toasting interval regardless of the starting temperature of the toaster as a whole or of the thermal timer.

According to this invention, a thermal timer is provided having an auxiliary heater with a reflector for directing heat from the auxiliary heater to the timer in which the reflector is so made that the amount of residual heat entrapped between the reflector and timer may be regulated and the amount of heat which may be entrapped is controlled thermostatically responsive to toaster temperature and manually to adjust for light, medium, or dark toast.

According to this invention a reflector is provided for reflecting heat from an auxiliary heater to a thermal timer in which the area of the reflector is variable, manually to adjust for light, medium, or dark toast and thermostatically to compensate for rises in toaster temperature with rapid successive use.

More specifically, according to this invention, a reflector is provided for directing heat from an auxiliary heater to a thermal timer in which a closeable opening or closeable openings are provided in the reflector, which opening or openings may be partially closed or opened manually to adjust for light, medium, or dark toast and thermostatically to compensate for rises in toaster temperature with repeated use.

Other objects and advantages of this invention will become apparent as the description proceeds when taken in connection with the accompanying drawings, in which.

Figure 1:
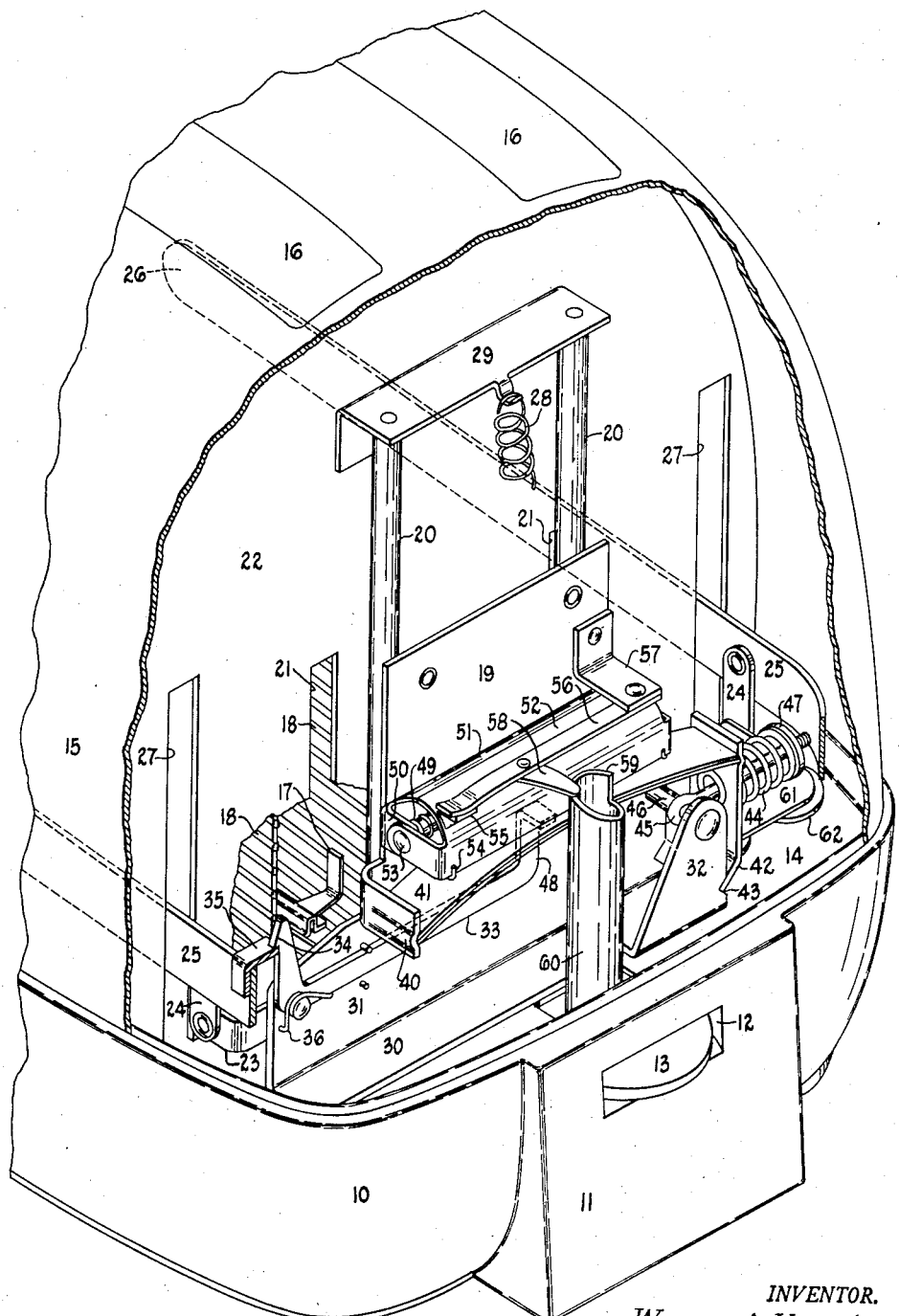
Figure 1 is a perspective view of a toaster with one modification of this invention applied thereto.

In the drawings, 10 indicates a base for a toaster which may be molded from insulating material. At its forward end the base 10 is provided with an enlargement 11, having an opening 12, through which extends the edge of an adjusting dial 13, the operation of which will be explained hereinafter.

Mounted upon a shoulder near the upper edge of the base 10 is a supporting plate 14. An appearance housing 15 is supported by the base 10 and extends downwardly about the periphery of the shoulder in the base 10 to the supporting plate 14. The appearance housing 15 is provided with bread receiving openings 16.

The bread receiving openings 16 overlie bread carriers 17 lying between spaced heaters 18 of any conventional construction. Bread carriers 17 extend rearwardly from a carriage plate 19 which is guided for vertical movement by guide rods 20 in a manner well known in the art. The forward ends of bread carriers 17 extend through openings 21 in a dividing plate 22 which separates the toasting chamber from the mechanism compartment.

Secured to the carriage plate 19, and extending outwardly and rearwardly therefrom on each side thereof are lugs 23, one of which is shown in Figure 1. Pivoted to the lugs 23 are a pair of links 24. At their upper ends links 24 are pivoted to a pair of arms 25, which in turn are pivoted at their rear ends to the walls of the toast chamber as at 26. The arms 25 extend through slots 27 in a dividing plate 22 and at their forward ends are extended through a slot in the appearance housing 15 and are attached to a manipulating handle as is well known in the art.

The arms 25 and correspondingly the carriage plate 19 and bread carriers 17 are normally spring-biased to an upper bread receiving position by a spring 28 which is anchored at its upper end to a bracket 29 and at its lower end to the arms 25 in a manner well known in the art.

Secured to the supporting plate 14 and extending upwardly therefrom is a bracket 30 having a rear upstanding portion 31 and a front upstanding lug 32. Pivoted to the left end of the portion 31 is a latch lever 33, having a hooked end 34 overlying a lug 35 on one of the arms 25 so as to latch the bread carriers 17 and carriage plate 19 in their lower toasting position.

The latch lever 33 is spring-biased into latching position by spring 36 so that when the bread carriers 17 are moved to toasting position by manipulation of levers 25, the hook 34 will engage over the lug 35 and hold the bread carriers 17 in toasting position against the bias of the spring 28.

Near the left end of the upstanding plate 31 and extending forwardly therefrom is a lug 40, which supports one end of a bimetallic snap acting thermal timer 41, the opposite end of which is supported by a link 42 pivoted to the upstanding portions 31 and 32 of bracket 30 as at 43.

A compressive force is applied to the ends of the thermal timer 41 by a compression spring 44 held in position by an eye bolt 45, the eye of which is anchored by a pin 46 extending between the upstanding portions 31 and 32 of the bracket 30. A nut 47 is threaded to the free end of the bolt 45 and contacts the outer end of the spring 44 to vary the compressive force applied to the spring 44 and correspondingly the compressive force on the ends of the timer 41. This constitutes a factory adjustment to adjust for variations in manufacturing tolerances.

The bimetallic timer 41 is so made that when cold it will occupy an upper bowed stable position as shown in Figure 1. When heated the timer 41 will move to a lower bowed stable position. As the timer 41 moves to its lower position it will pass through an intermediate unstable position and be snapped to its lower bowed position by the compressive force of spring 44.

When the timer 41 snaps to its lower bowed position it will contact the end 48 of lever 33 so as to move the hook 34 from above the lug 35 and permit the bread carriers 17 to move upwardly under the bias of the spring 28.

In order to heat the timer 41 an auxiliary heater 49 is supported on lugs 50 extending forwardly from the carriage plate 19. Immediately above the auxiliary heater 49 is a reflector having a fixed portion 51 and a movable portion 52. The movable portion 52 of the reflector is pivoted at 53 and is spring-biased in a closed position to contact the fixed portion 51 by a comparatively light spring 54.

A lug 55 extends outwardly from the portion 52 of the reflector and is adapted to be contacted by the free end of a compensating bimetal 56 supported at its opposite end by a bracket 57 extending forwardly from the carriage plate 19.

Secured to the central portion of the bimetal 56 is a cam plate 58, the outer end of which contacts the cam 59 on the upper end of a shaft 60 rigidly secured at its lower end to the adjusting dial 13.

A movable contact 61, carried by the carriage plate 19, contacts a fixed contact 62 secured to the supporting plate 14 so as to close the circuit to both the main heaters 18 and the auxiliary heater 49 when the carriage plate 19 is moved to lowered position by means of the manipulating handle attached to the arms 25.

*Operation*

Suppose, for example, the toaster is cold and the operator desired light toast. The dial 13 should be rotated so that the cam 59 will occupy the position shown in Figure 1. This will cause the cam 59 to contact the cam plate 58 and move the compensating bimetal 56 to its uppermost position. The movable part 52 of the reflector will be moved into contact with the fixed part 51 so as to form a closed or continuous reflector when the carriage plate 19 is moved to downward position.

The operator will then insert bread to the opening 16 so as to rest upon the bread carriers 17 and the arms 25 will be moved to lowered position by the manipulating handle. The lug 35 on arm 25 will bias the lever 33 clockwise until it occupies the position beneath the hook 34 which will latch the bread carriers 17 in their lower toasting position. At the same time the movable contact 61 will engage the fixed contact 62 and simultaneously energize the main heaters 18 and the auxiliary heater 49, causing toasting heat to be applied to the bread and timing heat to the timer 41.

As the temperature of the toaster as a whole rises, the temperature of the bimetallic timer 41 will also rise. If the temperature of the toaster as a whole rises sufficiently, the free end of the compensating bimetal 56 will have moved downwardly sufficiently to move the movable portion 52 of the reflector away from the fixed portion 51 so as to allow the heated air beneath the reflector to escape upwardly and prolong the toasting period accordingly.

At about the time the bread is toasted, the heater 49 will have heated the timer 41 so that it will have snapped downwardly past dead center position into its lowermost position.

This will cause the bimetallic timer 41 to contact the end 48 of the latch lever 33 so as to move the latch 34 from above the lug 35 and permit the carriers 17 to move upwardly under the bias of spring 28 and to deenergize both the main heaters 18 and the auxiliary heater 49. The bimetallic timer 41 will then cool in a matter of a few seconds and a second toasting operation may be initiated.

If now a second toasting operation is initiated the compensating bimetal 56 will be warm and the sections 51 and 52 of the reflector will be slightly separated to change in effect the area of the reflector which is reflecting heat to the timer 41 as well as to permit escape of the heated air from beneath the reflector through the opening thus formed so as to reduce its heating effect upon the timer 41. Since the timer 41 is now hotter than it was for the initial toasting operation, and the toaster as a whole is hotter it will take less time for the toast to be toasted and for the timer to operate. However, the opening of the reflector by the compensating bimetal 56, so as to change the reflecting area and permit the escape of the trapped heated air from beneath the reflector will prolong the heating of the timer 41 sufficiently to balance out the normal tendency of the timer 41 to over-compensate.

By proper design a toaster can be made which will cook bread to the same degree for each toasting operation whether an operation is begun when the toaster is hot or cold.

If darker toast is desired, the dial 13 is moved to the left so as to permit the bimetal 56 to separate the portions 51 and 52 of the reflector so as to change the area of the reflector to permit flow of heated air therethrough and to regulate and restrict such air flow so that the proper timing may be accomplished.

For example, for dark toast the dial may be set so that a very restricted opening exists between the sections 51 and 52 of the reflector. As the toasting operation proceeds its restriction is made larger and larger by the heating up of the bimetal 56. This will cause less heat to be reflected to the timer 41 and will cause it to be heated less by the heated air beneath the reflector.

It is to be noted that in the modification of Figure 1, the auxiliary heater 49, and the reflector sections 51 and 52 are removed bodily away from the timer 41 during inoperative periods to permit the timer 41 to cool quickly regardless of the position of the reflector sections 51 and 52. This will speed up the cooling of the timer 41 and eliminate the necessity of waiting for the timer to cool.

Figure 2:
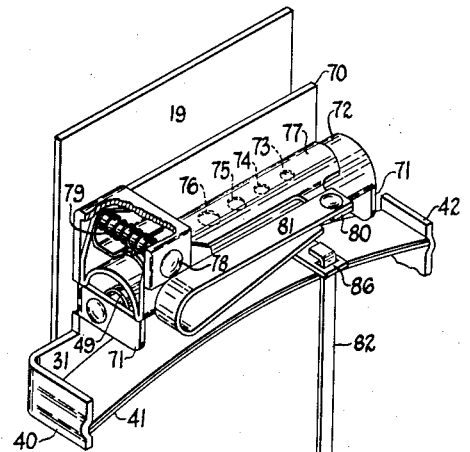
Figure 2 is a perspective view of a timer disclosing a second modification of this invention.
Figure 2:
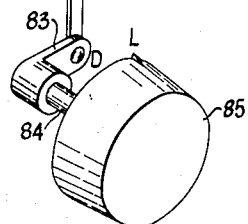
Figure 3:
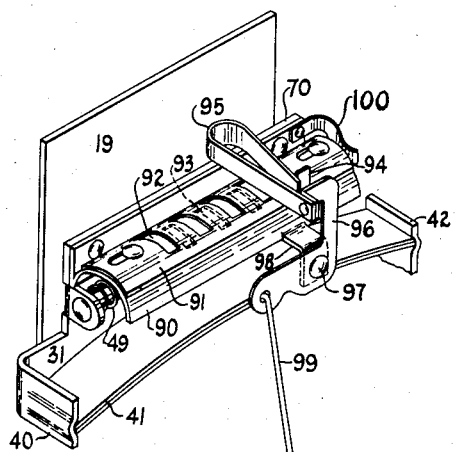
Figure 3 is a perspective view depicting a third modification of the invention.
Figure 3:
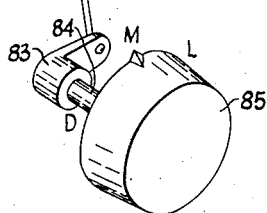

As will appear in the modification of Figures 2 and 3, however, the auxiliary heater and reflector remain in a fixed position relative to the timer.

In Figures 2 and 3, where the parts correspond to those of Figure 1, they have been given the same reference numerals. In Figures 2 and 3, the portion 31 of the bracket 30 has been extended upwardly as shown at 70. Struck forwardly from the upwardly extending portion 70 are a pair of forwardly extending lugs 71 which form a support for the auxiliary heater 49.

In the modification of Figure 2 a reflector 72 is also supported from the upwardly extending portion 70. The reflector 72 is provided with a plurality of openings 73, 74, 75, and 76 as shown in dotted lines. As shown, the openings are progressively larger from right to left, the opening 73 being the smallest and the opening 76 the largest. The openings 73 to 76, inclusive, can be made if desired in the form of a continuous tapered slit in the top of the reflector 72, the smaller end of the slit being at the right hand end and the larger at the left. A cover 77 for the openings 73 to 76, inclusive, is pivoted to the reflector 72 as at 78. A comparatively weak spring 79 normally biases the cover 77 clockwise so as to close the opening or openings in the reflector 72.

One end of a U-shaped compensating bimetal 81 is secured to a tab 80 extending forwardly from the cover 77 of the reflector 72. The free end of the bimetal 81 contacts the end of a link 82 guided for upward and downward reciprocating movement by an eye 86 extending forwardly from the reflector 72. At its lower end the link 82 is pivoted to a crank arm 83 rigidly secured to a shaft 84 adapted to extend through the enlargement 11 of base 10 of Figure 1. A manually operable knob 85 is also rigidly attached to the shaft 84 and is a substitute for the dial 13 of Figure 1. The knob 85 will be positioned exterior of the base 10 of Figure 1 in substantially the position of dial 13 of Figure 1.

*Operation of Figure 2*

If light toast is desired the knob 85 is rotated clockwise so as to move the upper end of link 82 out of contact with the end of the compensating bimetal 81 so that the cover 77 will be held against the upper surface of the reflector 72 by the bias of the spring 79 so as to close the openings 73 to 76, inclusive. This will confine the heat of the heater 49 beneath the reflector 72 so that the bimetal 41 will be heated in a short time such that the bread will be browned only to a light color during a toasting operation. Toward the end of the toasting interval the compensating bimetal 81 will have become heated sufficiently to have raised the right hand end of cover 77 so as to open the smallest opening 73 to allow for a restricted escape of heated air from beneath the reflector 72 so as to prevent the bimetal timer 41 from snapping to its downward position until the bread is sufficiently toasted.

If a second toasting operation is then initiated, the bimetal compensator 81 will hold the cover 77 upwardly so that the smaller opening 73 will remain opened. This will cause heat to be reflected to the timer 41 at a slower rate so as to nullify the tendency of the timer to over-compensate for rises in oven temperature with repeated use.

As the toaster as a whole and correspondingly the timer 41 heats up with repeated use the bimetallic compensator 81 will also heat up and open additional openings progressively such as 74, 75, etc. and prevent the timer 41 from over-compensating regardless of how often the toaster is operated in quick succession.

It is to be noted that also in the modification of Figure 2 as the cover 77 is raised upwardly the effective area of the reflector 72 for reflecting heat to the bimetal 41 is decreased.

If dark toast is desired the knob 85 is rotated counter-clockwise, which will cause the upper end of the link 82 to contact the free end of the bimetal compensator 81 and move the cover 77 upward slightly to open progressively one or more of the openings 73 to 76, inclusive, so that it will take a longer time to heat the timer 41 to its releasing temperature.

It is to be noted as in the modification of Figure 1 the opening of the cover 77 controls the flow of air from beneath the reflector 72 and also controls the effective area of the reflector.

As before the compensating bimetal 81 will operate to move the cover 77 more or less from its initial position to provide for the escape of more or less of the heated air from beneath the reflector and to regulate such escape by decreasing or increasing its flow. Additionally the compensating bimetal 81 will vary the reflective area of the reflector 72 so as to cause less heat to be reflected to the timer 41. This will prevent the thermostatic timer 41 from over-compensating and each slice will be cooked to the same degree whether it is first or fifth slice, thus overcoming the tendency of the timer 41 to over-compensate whether light, medium, or dark toast is desired.

According to the modification of Figure 3 the reflector 90 is attached to the upwardly extending portion 70 of the bracket 30. The reflector 90 is provided with a slidable cover plate 91 having openings 92 which are adapted to cover or uncover openings 93 in the reflector 90 as the cover plate is reciprocated.

Extending upwardly from the slidable cover plate 91 is a lug 94 adapted to engage the free end of a U-shaped compensating bimetal 95 which is supported by a link 96 pivoted at 97 to a lug 98 extending forwardly from the reflector 90. To the other end of the bell crank lever 96 is pivoted the upper end of a link 99 which in turn is pivoted to a crank arm 83 as in Figure 2. A comparatively light spring 100 normally holds the slidable cover 91 to the left and is moved therefrom by the compensating bimetal 95 to bring the openings 92, 93 into register.

The modification of Figure 3 operates in substantially the same manner as that of Figure 2 with the exception that the compensating bimetal 95 will reciprocate the sliding cover 91 so that the openings 92 in the cover will become more or less registered with the openings 93 in the reflector 90 as the toaster heats up with repeated use. Also the movement of the knob 85 will reciprocate the cover 91 so as to bring the openings 92 and 93 into more or less register and thus permit the escape of more or less air from beneath the heat reflector 90 and also to vary the effective area of the reflector 90.

It is to be noted that in each of the three modifications there is provided a two part reflector in which the parts are movable relative to each other to vary the effective area of the reflector and to more or less open a vent lying immediately above the auxiliary heater to allow for the escape of more or less heated air from above the timer and auxiliary heater. In both Figures 2 and 3 the upper parts act as a reflector when the openings are closed and does not when the openings are open.

As can be seen from the foregoing this invention provides a thermal timer for toasters comprising a thermally responsive element heated by an auxiliary heater in which a reflector reflects more or less heat from the auxiliary heater to the timer depending upon the setting of the manual adjustment selected by the user as well as by the ambient temperature of the toaster at the beginning and during the toasting operation.

The heat reflected from the auxiliary heater to the bimetal timer is regulated by regulating the effective area of the reflector depending upon the setting of the manual adjustment as well as upon the variations in toaster temperature during operation.

Also the heat transmitted to the thermal timer is regulated by preventing or allowing the escape of heated air from beneath the reflector so that more or less heat is transmitted to the thermal timer.

While I have shown and described but three modifications of my invention it is to be understood that these modifications are to be taken as illustrative only and not in a limiting sense. I do not wish to be limited to the particular structure shown and described but to include all equivalent variations thereof except as limited by the scope of the claims.

I claim:

1. In a toaster a thermal timer for timing the duration of the toasting interval, a heater for said thermal timer, a reflector having a reflecting surface facing said timer for directing heat from said heater to said thermal timer, manually actuatable means for energizing said heater and means for varying the reflecting surface of said reflector for varying the timing period of said thermal timer.

2. In a toaster in accordance with claim 1 in which said last mentioned means is responsive to variations in ambient temperature.

3. In a toaster in accordance with claim 1 in which said last mentioned means includes manual means for varying the effective reflecting area of said reflector to vary the heat transmitted to said timer so as to control the timing interval.

4. In a toaster in accordance with claim 1 in which said last mentioned means includes manual means for varying the effective reflecting area of said reflector to set the timing period of said timer and means super-imposed upon said manual means responsive to ambient temperature for further varying the effective reflecting area of said reflector to prevent over-compensation of said timer with variations in ambient temperature.

5. In a toaster a thermal timer for timing the duration of the timed interval, a heater for said timer, a reflector for directing heat from said heater to said timer, said heater lying between said reflector and timer whereby heated air may be trapped between said heater and reflector adjacent to said timer, manually actuatable means for energizing said heater and means for venting more or less heated air from between said auxiliary heater and reflector to vary the heat transmitted to said timer and thus vary its timing period.

6. In a toaster according to claim 5 in which said vent means includes manual means to vary the timing period and thermostatic means to vary the timing period in accordance with ambient temperature.

7. In a toaster a thermal timer for timing the duration of the toasting interval, a heater lying in spaced parallel relationship to said timer, a reflector for reflecting heat from said heater to said timer and lying in spaced parallel relationship to both said timer and said auxiliary heater with said auxiliary heater lying between said reflector and timer so as to trap heated air adjacent to said timer, manually actuatable means for energizing said heater and means for changing the effective area of said reflector and for venting more or less of said heated air away from said timer to vary the heat transmitted to said timer and thus vary its timing period.

8. In a toaster according to claim 7 in which said last mentioned means includes manual means to vary the timing period and thermostatic means to vary the timing period in accordance with ambient temperature.

9. In a toaster a thermal timer for timing the duration of the toasting interval; a heater; a reflector for reflecting heat from said heater to said timer; said timer, heater and reflector lying in substantially a horizontal position with said heater above said timer and said reflector above said heater; means for energizing said heater and means for providing an opening in said reflector above said auxiliary heater to control the escape of heated air upwardly away from said timer and heater to control the duration of the toasting interval.

10. In a toaster according to claim 9 in which said last mentioned means includes manual means to vary the timing period and thermostatic means to vary the timing period in accordance with ambient temperature.

11. In a toaster a thermal timer for timing the duration of the toasting interval, a heater, a two part reflector for reflecting heat from said heater to said timer and means for moving one part of said reflector relative to the other part so as to vary the effective area of said reflector to thus control the timing period of said timer.

12. In a toaster according to claim 11 in which said last mentioned means includes manual means to vary the timing period and thermostatic means to vary the timing period in accordance with ambient temperature.

13. In a toaster a thermal timer for timing the duration of the toasting interval; a heater; a two part reflector for reflecting heat from said heater to said timer; said timer, heater and reflector lying in substantially a horizontal position with said heater above said timer and said reflector above said heater; means for energizing said auxiliary heater and means for moving one part of said reflector relative to the other part for venting heated air from above said timer and said heater to control the quantity of heat transmitted to said timer and thus control the duration of the toasting interval.

14. In a toaster according to claim 13 in which said last mentioned means includes manual means to vary the timing period and thermostatic means to vary the timing period in accordance with ambient temperature.

15. In a toaster a thermal timer for timing the duration of the toasting interval; a heater; a two part reflector for reflecting heat from said heater to said timer; said timer, heater and reflector lying in substantially a horizontal position with said auxiliary heater above said timer and said reflector above said heater; means for energizing said auxiliary heater and means for moving one part of said reflector relative to the other part for venting heated air from above said timer and said heater and for varying the effective area of said reflector to control the quantity of heat transmitted to said timer and thus control the duration of the timed interval.

16. In a toaster according to claim 15 in which said last mentioned means includes manual means to vary the timing period and thermostatic means to vary the timing period in accordance with ambient temperature.

17. In a toaster a thermal timer for timing the duration of the toasting interval; a heater; a reflector for reflecting heat from said heater to said timer; said timer, heater and reflector lying in substantially a horizontal position with the heater above said timer and said reflector above said heater; said reflector comprising two parts movable toward and away from each other in a line directly above said heater; means for energizing said heater and means for moving said parts toward and away from each other to vary the quantity of heat transmitted to said timer to control the duration of the toasting interval.

18. In a toaster a thermal timer for timing the duration of the toasting interval; a heater; a reflector for reflecting heat from said heater to said timer; said timer, heater and reflector lying in substantially a horizontal position with the heater above said reflector and said reflector above said heater; said reflector comprising two parts, one having vent means lying over said heater and the other movable relative thereto to open and close said vent means; means for energizing said heater and means for moving said parts toward and away from each other to open and close said vent means to vary the quantity of heat transmitted to said timer so as to control the duration of the toasting interval.

19. In a toaster a thermal timer for timing the duration of the toasting interval; a heater; a reflector for reflecting heat from said heater to said timer; said timer, heater and reflector lying in substantially a horizontal position with said heater above said timer and said reflector above said heater; said reflector comprising two parts one having vent means above said heater of varying size from one end of said reflector to the other and the other being movable toward and away from the first to progressively open and close said vent means; means for energizing said heater and means for moving said second part toward and away from said first part for varying the size of said vent means to vary the quantity of heat transmitted to said timer and thus control the duration of the toasting interval.

20. In a toaster a thermal timer for timing the duration of the toasting interval; a heater; a reflector for reflecting heat from said heater to said timer; said timer, heater and reflector lying in substantially a horizontal position with said heater above said timer and said reflector above said heater; said reflector comprising two parts slidable relative to each other and each having openings therein above said heater; means for energizing said heater and means for sliding said parts relative to each other to control the effective size of said openings so as to control the quantity of heat transmitted to said timer and thus control the duration of the toasting interval.

WARREN A. HUMPHREY.

REFERENCES CITED

The following references are of record in the file of this patent:

UNITED STATES PATENTS

| Number | Name | Date |
|---|---|---|
| 917,195 | Van Aller | Apr. 6, 1909 |
| 1,515,730 | Cole | Nov. 18, 1924 |
| 1,862,733 | Wright | June 14, 1932 |
| 2,237,146 | Ireland | Apr. 1, 1941 |
| 2,271,485 | Koci | Jan. 27, 1942 |
| 2,436,735 | Walder et al. | Feb. 24, 1948 |

Certificate of Correction

Patent No. 2,558,438

June 26, 1951

WARREN A. HUMPHREY

It is hereby certified that error appears in the printed specification of the above numbered patent requiring correction as follows:

Column 9, line 46, before "heater" strike out "auxiliary";

and that the said Letters Patent should be read as corrected above, so that the same may conform to the record of the case in the Patent Office.

Signed and sealed this 22nd day of January, A. D. 1952.

[SEAL]

THOMAS F. MURPHY,
*Assistant Commissioner of Patents.*